United States Patent
Greasley

(10) Patent No.: US 11,301,966 B2
(45) Date of Patent: Apr. 12, 2022

(54) PER-PIXEL FILTER

(71) Applicant: Apple Inc., Cupertino, CA (US)

(72) Inventor: Jack Greasley, San Francisco, CA (US)

(73) Assignee: APPLE INC., Cupertino, CA (US)

(*) Notice: Subject to any disclaimer, the term of this patent is extended or adjusted under 35 U.S.C. 154(b) by 126 days.

(21) Appl. No.: 16/676,245

(22) Filed: Nov. 6, 2019

(65) Prior Publication Data

US 2020/0184608 A1 Jun. 11, 2020

Related U.S. Application Data

(60) Provisional application No. 62/777,443, filed on Dec. 10, 2018.

(51) Int. Cl.

| | |
|---|---|
| G06K 9/00 | (2022.01) |
| G06K 9/32 | (2006.01) |
| G06T 5/00 | (2006.01) |
| G06T 11/00 | (2006.01) |
| G06T 5/20 | (2006.01) |
| G06T 7/30 | (2017.01) |

(52) U.S. Cl.
CPC ............ *G06T 5/004* (2013.01); *G06T 5/20* (2013.01); *G06T 7/30* (2017.01); *G06T 11/001* (2013.01)

(58) Field of Classification Search
None
See application file for complete search history.

(56) References Cited

U.S. PATENT DOCUMENTS 10,089,518 B2 * 10/2018 Bengtsson ............... G06T 7/10
10,452,892 B2 * 10/2019 Hanai ................... G06T 19/006
(Continued)

FOREIGN PATENT DOCUMENTS

| CA | 2419670 A1 | 1/2003 |
|---|---|---|
| CN | 102067175 A | 5/2011 |

(Continued)

OTHER PUBLICATIONS

Sun et al. "Hybrid Model for Identity Obfuscation by Face Replacement", ECCV 2018 (Year: 2018).*

(Continued)

*Primary Examiner* — Randolph I Chu
(74) *Attorney, Agent, or Firm* — Fernando & Partners, LLP

(57) ABSTRACT

Various implementations disclosed herein include devices, systems, and methods for per-pixel filtering. In some implementations, a method includes obtaining an image data frame. In some implementations, the image data frame includes a plurality of pixels. In some implementations, the method includes generating a respective pixel characterization vector for each of the plurality of pixels. In some implementations, each pixel characterization vector includes an object label indicating an object type that the corresponding pixel of the plurality of pixels represents. In some implementations, the method includes modifying corresponding pixel data of the plurality of pixels having a first object label. In some implementations, the method includes synthesizing a first modified image data frame that includes modified pixel data for the plurality of pixels having the first object label and unmodified pixel data for the plurality of pixels not having the first object label.

26 Claims, 9 Drawing Sheets

(56) References Cited

U.S. PATENT DOCUMENTS

| | | | |
|---|---|---|---|
| 2009/0016645 A1* | 1/2009 | Sako | H04N 1/00851 |
| | | | 382/298 |
| 2009/0262987 A1 | 10/2009 | Ioffe et al. | |
| 2016/0182971 A1* | 6/2016 | Ortiz | H04N 21/42224 |
| | | | 725/34 |
| 2016/0314306 A1* | 10/2016 | Takahashi | G06F 21/602 |
| 2016/0335289 A1* | 11/2016 | Andrews | G06Q 50/16 |
| 2019/0138748 A1* | 5/2019 | Long | G06V 40/161 |
| 2020/0184278 A1* | 6/2020 | Zadeh | G06F 16/43 |

FOREIGN PATENT DOCUMENTS

| | | |
|---|---|---|
| CN | 103871051 A | 6/2014 |
| CN | 103942469 A | 7/2014 |
| CN | 105354509 A | 2/2016 |
| CN | 106485164 A | 3/2017 |

OTHER PUBLICATIONS

Neuhold "Accurate Privacy Blurring at Scale", https://blog.mapillary.com/update/2018/04/19/accurate-privacy-blurring-at-scale.html, Apr. 2018 (Year: 2018).*
Rocca, "Inside MLB's Virtual Ads at the World Serie", Fox Business, Jul. 6, 2017 (Year: 2017).*
Chinese Office Action and Search Report dated Jul. 21, 2021, Chinese Application No. 2019112432259, pp. 1-14 (Including English Translation of Search Report).

* cited by examiner

400

- Obtain image data frame including a plurality of pixels — 410
  - Capture/receive image data frame 410a
  - Image data frame is part of a video feed 410b
  - Image data frame corresponds to a physical/CGR environ. 410c

- Generate pixel ch. vector for each pixel — 420
  - Pixel labeler generates the pixel ch. vectors 420a
  - ML segmentation system generates the pixel ch. vectors 420b

- Modify pixel data for pixels with first object label — 430
  - Change pixel data to obfuscate first object type 430a
  - Blur the pixels 430b
  - Change RGB value of pixels 430c
  - Identify pixels with the first object label 430d
  - First object label references physical article/CGR object 430e

- Synthesize modified image data frame — 440
  - Provide modified image data frame for rendering & display 440a

FIG. 4A

PER-PIXEL FILTER

CROSS REFERENCE TO RELATED APPLICATIONS

This application claims priority to U.S. patent application No. 62/777,443, filed on Dec. 10, 2018, which is hereby incorporated by reference in its entirety.

TECHNICAL FIELD

The present disclosure generally relates to filtering, and, in particular, to a per-pixel filter.

BACKGROUND

Some devices are capable of providing images to other devices. For example, some devices include a camera that captures a video feed which is transmitted to other devices. Users of some devices transmit video captured by their devices to other devices during video calls. Being able to transmit and/or receive video data provides a better user experience than just transmitting or receiving voice data. However, some users decide not to transmit video in order to avoid the risk of transmitting certain (e.g., undesirable) information. For example, users that are located in areas with confidential information often decide not to transmit video during video calls in order to reduce the risk of leaking the confidential information. Similarly, some users decide not to receive video because they do not want to view undesirable information. Some enterprises prevent their employees from transmitting or receiving video in order to reduce the risk of leaking confidential information. For example, some enterprises do not allow video calls over enterprise networks controlled by the enterprises.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A and 4B are flowchart representations of a method of synthesizing a modified image data frame in accordance with some implementations.

Figure 1A:
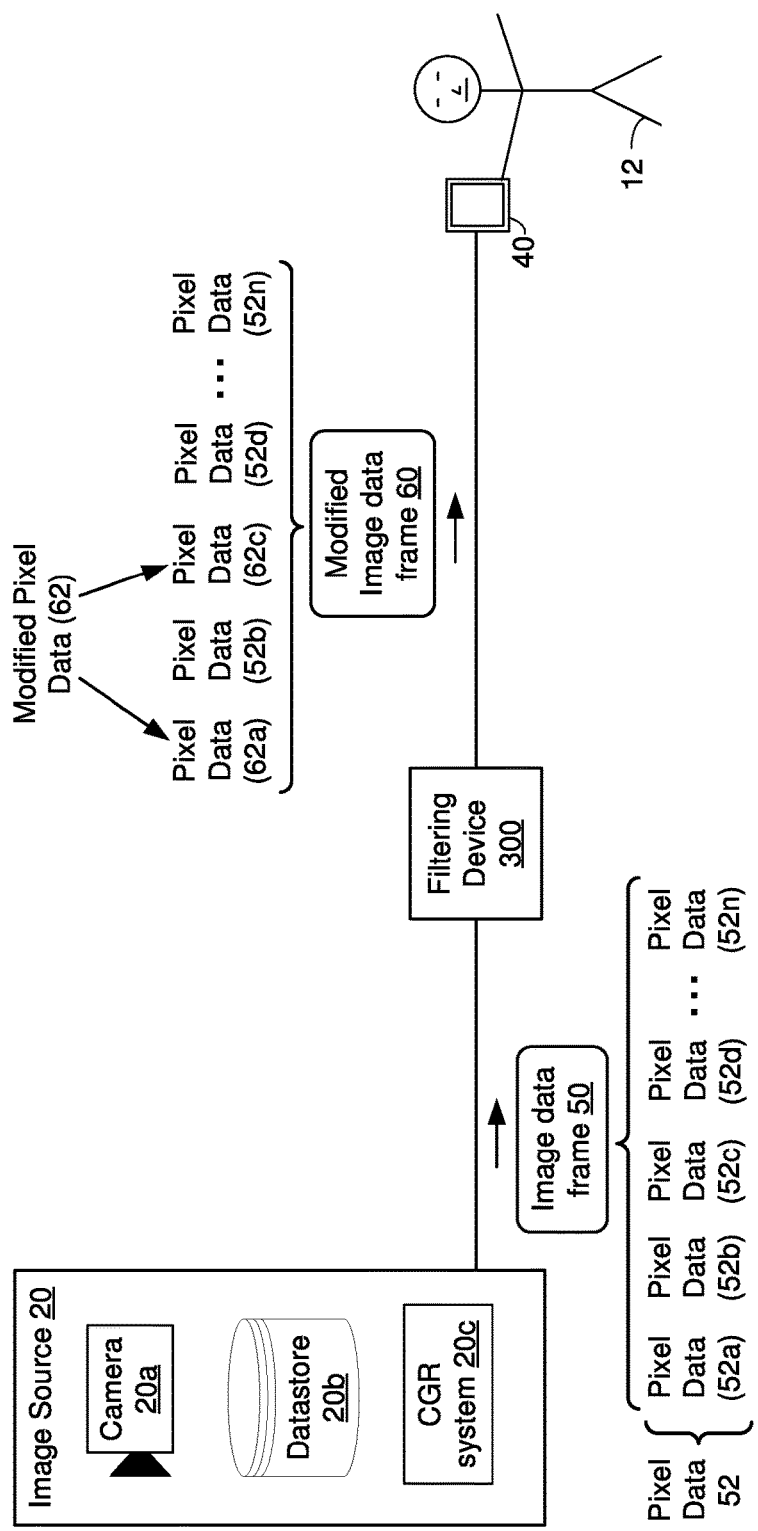
FIGS. 1A-1B illustrate example operating environments in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and FIGS.

SUMMARY

Various implementations disclosed herein include devices, systems, and methods for per-pixel filtering. In various implementations, a device includes a non-transitory memory and one or more processors coupled with the non-transitory memory. In some implementations, a method includes obtaining an image data frame. In some implementations, the image data frame includes a plurality of pixels. In some implementations, the method includes generating a respective pixel characterization vector for each of the plurality of pixels. In some implementations, each pixel characterization vector includes an object label indicating an object type that the corresponding pixel of the plurality of pixels represents. In some implementations, the method includes modifying corresponding pixel data of the plurality of pixels having a first object label. In some implementations, the method includes synthesizing a first modified image data frame that includes modified pixel data for the plurality of pixels having the first object label and unmodified pixel data for the plurality of pixels not having the first object label.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment.

In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for filtering an image data frame in order to obfuscate an object represented by one or more pixels in the image data frame. In various implementations, filtering the image data frame includes identifying pixels that correspond to a particular object, and changing the values of the pixels that correspond to the particular object. In some implementations, obfuscating the representation of the object includes blurring the pixels that correspond to the object. In some implementations, obfuscating the representation of the object includes setting the value of the pixels to a particular color (e.g., black, white, etc.). In some implementations, obfuscating the representation of the object includes replacing the representation of the object with a representation of another object.

FIG. 1A illustrates an exemplary operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an image source 20, a client device 40, and a filtering device 300. In the example of FIG. 1A, the filtering device 300 is shown as being separate from the image source 20 and the client device 40. However, in some implementations, the filtering device 300 and the image source 20 are integrated into a single device. Alternatively, in some implementations, the filtering device 300 is integrated into the client device 40. In some implementations, the filtering device 300 resides at (e.g., is integrated within) a server (e.g., an enterprise server that is controlled by an enterprise).

In various implementations, the image source 20 provides an image data frame 50 to the filtering device 300. In various implementations, the image source 20 includes a camera 20a that captures the image data frame 50. In some implementations, the camera 20a is integrated into another device, such as a mobile computing device (e.g., a smartphone). In some implementations, the image source 20 includes a datastore 20b that stores the image data frame 50. In some implementations, the image source 20 includes a computer-generated reality (CGR) system 20c that generates a CGR experience, and the image data frame 50 is part of the CGR experience.

As shown in FIG. 1A, the image data frame 50 includes pixel data 52 for various pixels in the image data frame 50. For example, the image data frame 50 includes first pixel data 52a for a first pixel, second pixel data 52b for a second pixel, third pixel data 52c for a third pixel, fourth pixel data 52d for a fourth pixel, and nth pixel data 52n for an nth pixel. In some implementations, the pixel data 52 includes pixel values. For example, the pixel data 52 includes red, green, and blue (RGB) color values for the corresponding pixels.

In various implementations, the filtering device 300 modifies the image data frame 50 in order to generate a modified image data frame 60. In some implementations, the filtering device 300 modifies the image data frame 50 in order to obfuscate a representation of an object from the image data frame 50. In some implementations, the filtering device 300 changes the values of some of the pixels, while leaving the values of other pixels unchanged. In the example of FIG. 1A, the modified image data frame 60 includes modified pixel data 62 for some of the pixels. For example, the modified image data frame 60 includes modified pixel data 62a for the first pixel and modified pixel data 62c for the third pixel. As shown in FIG. 1A, in some implementations, the modified image data frame 60 also includes unmodified pixel data for some pixels. For example, the modified image data frame 60 includes unmodified second pixel data 52b for the second pixel, unmodified fourth pixel data 52d for the fourth pixel, and unmodified pixel data 52n for the nth pixel.

In various implementations, the client device 40 obtains the modified image data frame 60, and renders the modified image data frame 60 on a display of the client device 40. Since the modified image data frame 60 includes modified pixel data 62, in some implementations, some of the pixels displayed at the client device 40 are obfuscated. For example, in some implementations, some of the pixels displayed at the client device 40 are blurred. In some implementations, some of the pixels displayed at the client device 40 are masked (e.g., blacked-out). In various implementations, the client device 40 includes a mobile computing device (e.g., a smartphone, a tablet, or a laptop), a desktop, a television, and/or a CGR device (e.g., a head-mountable device such as an AR/VR headset). In the example of FIG. 1A, the client device 40 is being held by a user 12.

In various implementations, the filtering device 300 allows the image source 20 to provide the image data frame 50 while preventing the client device 40 from viewing certain information represented by the image data frame 50. As such, the filtering device 300 provides more control over what the user 12 of the client device 40 is able to view. In various implementations, the filtering device 300 reduces the need to block transmittal of image data frames altogether because the filtering device 300 allows certain object types to be obfuscated thereby enhancing user experience. In various implementations, the filtering device 300 thus enhances a user's privacy by obfuscating or otherwise limiting the transmission of information from the user's environment to another, at the user's control.

Figure 1B:
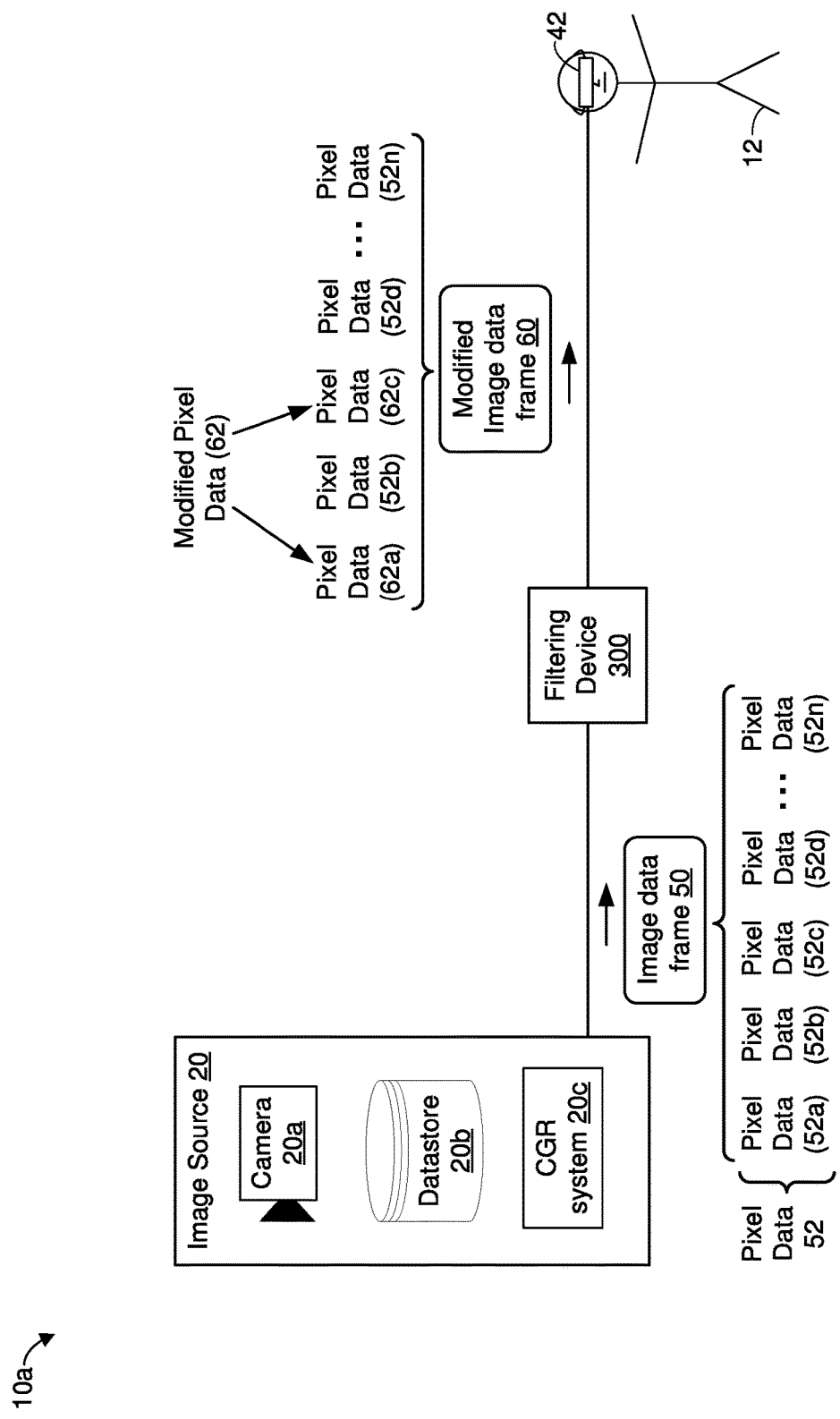

Referring to FIG. 1B, a head-mountable device (HMD) 42, being worn by the user 10, presents (e.g., displays) a CGR environment that includes the modified image data frame 60. In some implementations, the HMD 42 includes an integrated display (e.g., a built-in display) that displays the CGR environment. In some implementations, the HMD 42 includes a head-mountable enclosure. In various implementations, the head-mountable enclosure includes an attachment region to which another device with a display can be attached. For example, in some implementations, the client device 40 (shown in FIG. 1A) can be attached to the head-mountable enclosure. In various implementations, the head-mountable enclosure is shaped to form a receptacle for receiving another device that includes a display (e.g., the client device 40 shown in FIG. 1A). For example, in some implementations, the client device 40 slides/snaps into or otherwise attaches to the head-mountable enclosure. In some implementations, the display of the device attached to the head-mountable enclosure presents (e.g., displays) the CGR environment. In various implementations, examples of the client device 40 include smartphones, tablets, media players, laptops, etc.

Figure 2A:
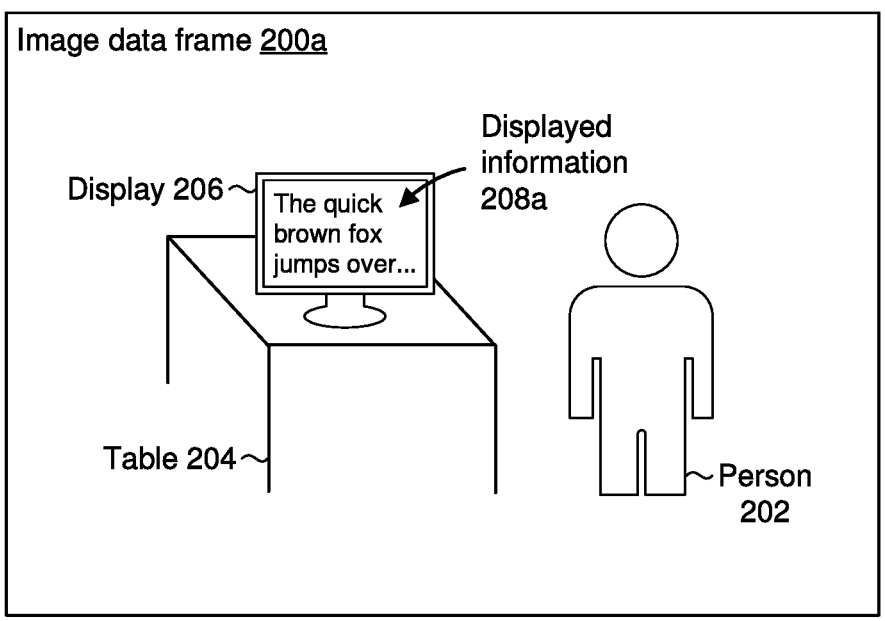
FIGS. 2A-2F are diagrams of example image data frames in accordance with some implementations.

FIG. 2A illustrates an example image data frame 200a. The image data frame 200a includes pixels that represent a person 202, a table 204, a display 206, and information 208a that is displayed on the display 206 ("displayed information 208a", hereinafter for the sake of brevity). In the example of FIG. 2A, the displayed information 208a includes text. In some implementations, the filtering device 300 obtains the image data frame 200a from the image source 20. For example, in some implementations, the camera 20a captures the image data frame 200a, and the camera 20a provides the image data frame 200a to the filtering device 300. In some implementations, the image data frame 200a is part of a video feed. For example, the image data frame 200a is a video frame.

Figure 2B:
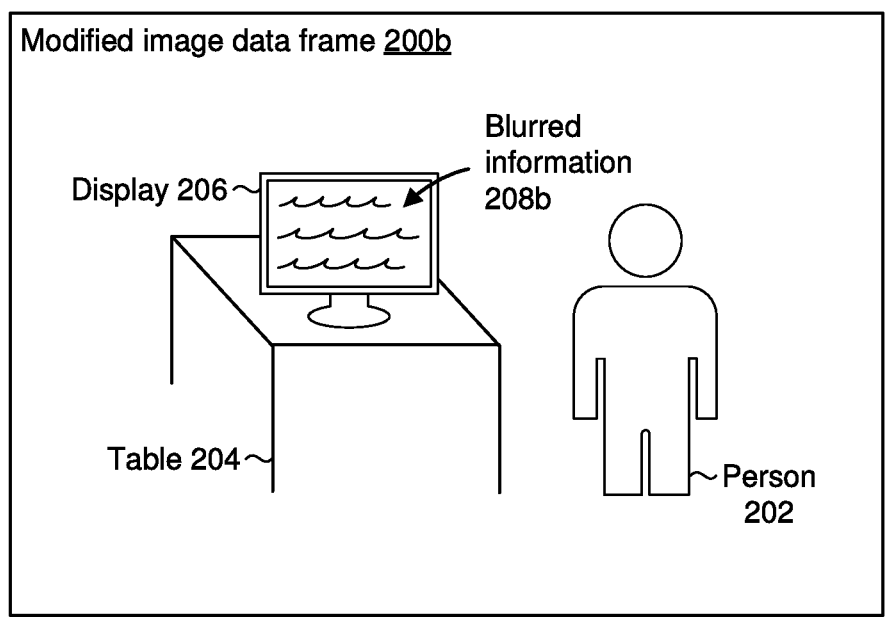

FIG. 2B illustrates a modified image data frame 200b. As illustrated in FIG. 2B, the display 206 displays blurred information 208b instead of the displayed information 208a shown in FIG. 2A. The filtering device 300 modifies the pixels corresponding to the displayed information 208a in order to generate the blurred information 208b. In some implementations, the blurred information 208b is a blurred version (e.g., a distorted version) of the displayed information 208a. In some implementations, the blurred information 208b is not readily readable by the user 12 of the client device 40. In some implementations, a display policy specifies which object(s) is(are) to be blurred. In the example of FIGS. 2A and 2B, a display policy specifies that information displayed on displays is to be blurred.

Figure 2C:
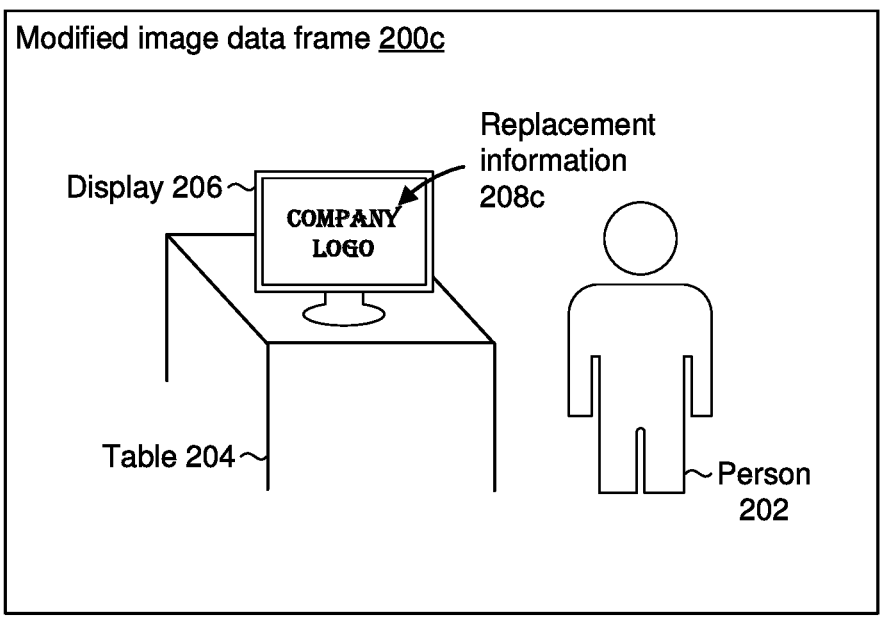

FIG. 2C illustrates a modified image data frame 200c. As illustrated in FIG. 2C, the display 206 displays replacement information 208c instead of the displayed information 208a shown in FIG. 2A. In some implementations, a display policy specifies the replacement information 208c. For example, a display policy administered by an enterprise specifies that the displayed information 208a is to be replaced by a company logo. In the example of FIG. 2C, the filtering device 300 has modified the pixels corresponding to the displayed information 208a to display the replacement information 208c. In some implementations, the replacement information 208c is specified by a user of the client device 40. Alternatively, in some implementations, the replacement information 208c is specified by an entity that controls the image source 20 (e.g., a user of the camera 20a). In some implementations, a display policy specifies that a first object type is to be replace with a second object type (e.g., displays are to be replaced with flower pots, spiders are to be replaced with caterpillars, etc.).

Figure 2D:
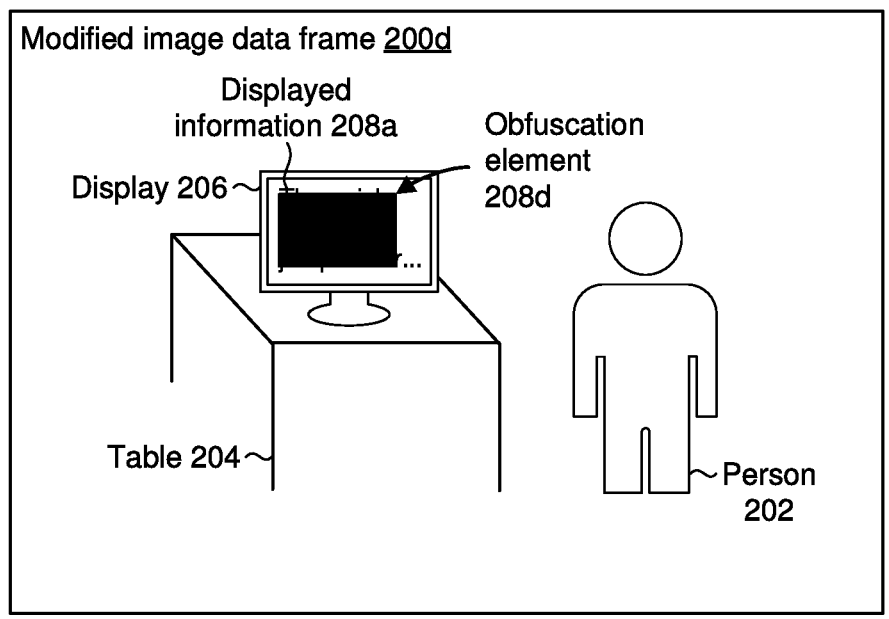

FIG. 2D illustrates a modified image data frame 200d. As illustrated in FIG. 2D, there is an obfuscation element 208d that obfuscates at least a portion of the displayed information 208a (e.g., a majority of the displayed information 208a, or all of the displayed information 208a). In the example of FIG. 2D, the obfuscation element 208d includes a black rectangle that is overlaid on top of most of the displayed information 208a. In some implementations, a display policy specifies how much of the displayed information 208a is to be obfuscated. In some implementations, a display policy specifies which object(s) is(are) to be obfuscated. In some implementations, a display policy specifies that information displayed on displays (e.g., monitors, televisions, smartphones and/or tablets) is to be obfuscated. More generally, in various implementations, a display policy specifies that a type of object is to be obfuscated. For example, in some implementations, a display policy specifies that human faces are to be obfuscated.

Figure 2E:
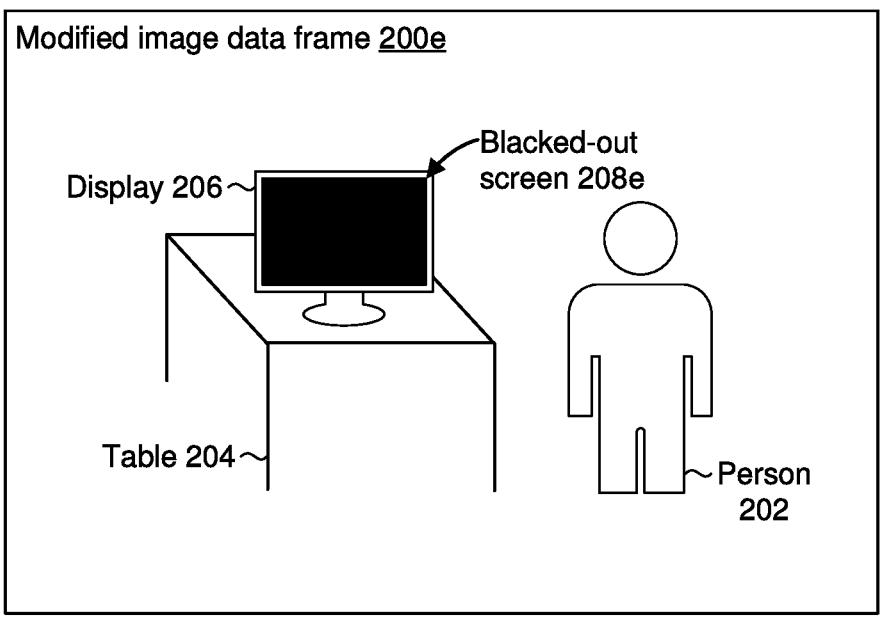

FIG. 2E illustrates a modified image data frame 200e. As illustrated in FIG. 2E, the display 206 displays a blacked-out screen 208e instead of the information 208a shown in FIG. 2A. In the example of FIG. 2E, the filtering device 300 modifies the pixels corresponding to the display 206 so that all the pixels corresponding to the display 206 are black in color. More generally, in various implementations, the filtering device 300 modifies pixels corresponding to an object so that all pixels corresponding to the object display the same color (e.g., white, blue, green, etc.). In some implementations, a display policy specifies that all pixels corresponding to displays are to be modified such that the displays appear blacked-out. More generally, in various implementations, a display policy specifies that all pixels corresponding to a particular type of object (e.g., displays, human faces, etc.) are to be modified such that objects of that particular type are blacked-out.

Figure 2F:
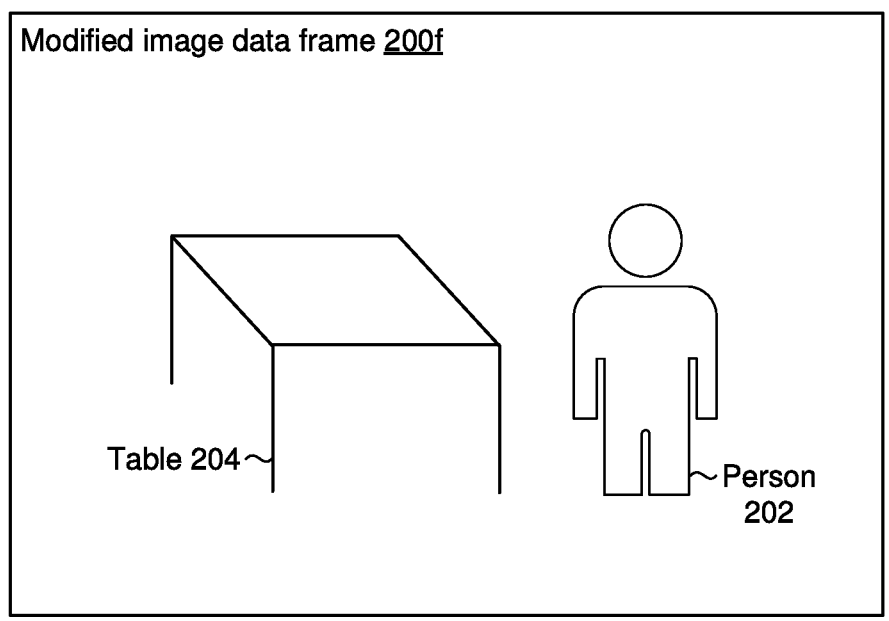

FIG. 2F illustrates a modified image data frame 200f. As illustrated in FIG. 2F, the display 206 is missing from the modified image data frame 200f. In some implementations, a display policy specifies that objects of a particular type are to be removed from the image data frame. In the examples of FIGS. 2A and 2F, the display policy specifies that displays are to be removed from the image data frame 200. As such, the display 206 is removed from the image data frame 200 in order to generate the modified image data frame 200f, as illustrated in FIG. 2F.

Figure 3:
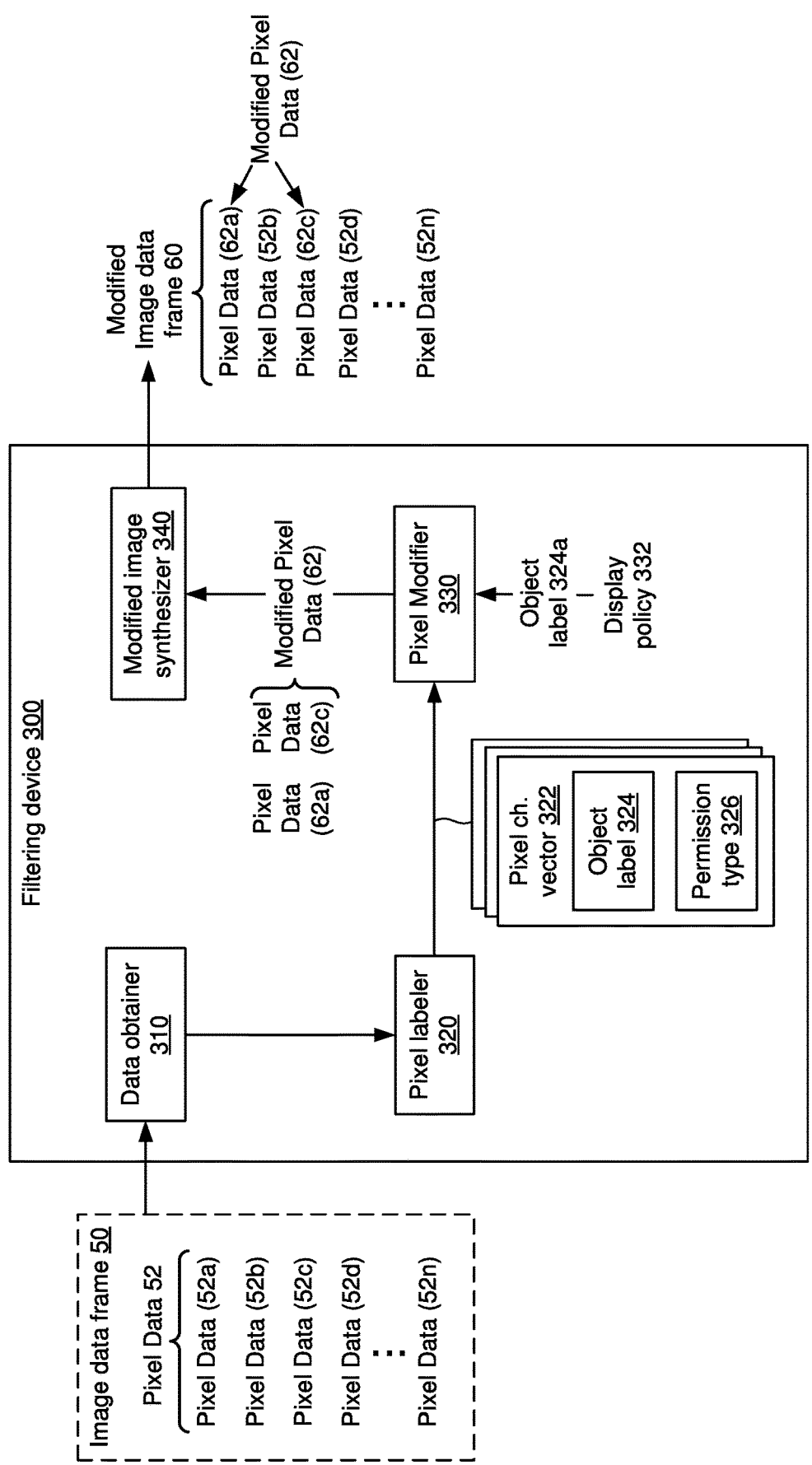
FIG. 3 is a block diagram of an example filtering device in accordance with some implementations.

FIG. 3 illustrates the filtering device 300 in accordance with some implementations. In some implementations, the filtering device 300 includes a data obtainer 310, a pixel labeler 320, a pixel modifier 330, and a modified image synthesizer 340. In various implementations, the data obtainer 310 obtains image data frames. For example, in some implementations, the data obtainer 310 obtains the image data frame 50. In some implementations, the data obtainer 310 receives the image data frame 50, for example, from the image source 20 shown in FIG. 1A. In some implementations, the data obtainer 310 retrieves the image data frame 50, for example, from the image source 20 (e.g., the datastore 20b shown in FIG. 1A). In some implementations, the data obtainer 310 obtains a video feed, and extracts image data frames from the video feed.

In various implementations, the pixel labeler 320 generates a respective pixel characterization vector 322 for each of the pixels in the image data frame 50. In some implementations, each pixel characterization vector 322 includes an object label 324 indicating an object type that the corresponding pixel represents. In some implementations, the pixel labeler 320 utilizes a machine learning segmentation system in order to generate the pixel characterization vectors 322 and determine the object labels 324. In some implementations, the pixel labeler 320 utilizes a neural network in order to determine the object labels 324. For example, in some implementations, the pixel labeler 320 utilizes a neural network in order to classify each pixel in the image data frame 50 into one of many known object types. In some implementations, the pixel labeler 320 is trained with training data that includes images along with human-curated object labels for various pixels in the images.

In various implementations, the pixel modifier 330 modifies corresponding pixel data of pixels having a first object label 324a. In some implementations, the pixel modifier 330 obtains a display policy 332 which specifies that pixels corresponding to the first object label 324a are to be obfuscated. In some implementations, the pixel modifier 330 modifies the pixel data of pixels that are associated with the first object label 324a in order to obfuscate an object referenced by the first object label 324a. For example, in some implementations, the first object label 324a refers to information that is displayed on a display (e.g., the displayed information 208a shown in FIG. 2A). In such implementations, the pixel modifier 330 modifies the pixel values of all pixels which correspond to information that is displayed on a display.

In various implementations, the pixel modifier 330 generates modified pixel data 62. For example, the pixel modifier 330 generates modified pixel data 62a for the first pixel in the image data frame 50, and modified pixel data 62c for the third pixel in the image data frame 50. In some implementations, the pixel modifier 330 provides the modified pixel data 62 to the modified image synthesizer 340. In some implementations, the modified pixel data 62 includes RGB values for pixels that have the first object label 324a.

In various implementations, the modified image synthesizer 340 synthesizes the modified image data frame 60 based on the modified pixel data 62. The modified image data frame 60 synthesized by the modified image synthesizer 340 includes the modified pixel data 62 and unmodified pixel data for the pixels that do not have the first object label 324a. In the example of FIG. 3, the modified image data frame 60 includes the modified pixel data 62 for the first pixel and the third pixel, and unmodified pixel data for the second pixel, the fourth pixel, and the nth pixel. In some implementations, the modified image synthesizer 340 provides the modified image data frame 60 to a rendering and display pipeline. In some implementations, the modified image synthesizer 340 transmits the modified image data frame 60 to another device that displays the modified image data frame 60.

In some implementations, the first object label 324a identifies a first object type, and the display policy 332 specifies that all objects of the first object type are to be obfuscated. In such implementations, the pixel modifier 330 identifies all pixels that have the first object type 324a, and performs an obfuscation operation on the identified pixels in order to obfuscate objects of the first object type. For example, in some implementations, the display policy 332 specifies that computer display screens are to be obfuscated.

In some implementations, the obfuscation operation includes a replacement operation. In some implementations, the display policy 332 specifies a replacement object and/or a replacement object type. In such implementations, the pixel modifier 330 replaces objects of the first object type 324a with the replacement object. For example, in some implementations, the first object type 324a is a spider, and the replacement object is a caterpillar. In such implementations, the pixel modifier 330 replaces all spiders with caterpillars.

In some implementations, the display policy 332 is provided by a user (e.g., by a user of the client device 40 shown in FIG. 1A). In some implementations, the filtering device 300 obtains a user preference selection for replacing an object type with another object type. For example, the filtering device 300 receives a user preference selection indicating that all spiders are to be replaced with caterpillars.

In some implementations, the obfuscation operation performed by the pixel modifier 330 includes a blurring operation. For example, as shown in FIG. 2B, in some implementations, the pixel modifier 330 changes the pixel values of pixels corresponding to the first object type 324 in order to generate the blurred information 208b. In some implementations, blurring the pixels results in obfuscation of the pixels because blurring the pixels reduces the clarity of the pixels (e.g., blurring pixels that correspond to text reduces the readability of the text).

In some implementations, the obfuscation operation performed by the pixel modifier 330 includes changing pixel values to a particular color (e.g., black, white, blue, green, etc.). For example, as shown in FIG. 2E, the pixel modifier 330 changes the pixels values of pixels corresponding to the display screen to black.

In some implementations, the obfuscation operation includes superimposing an obfuscation element on objects of the first object type 324a. For example, as shown in FIG. 2D, the pixel modifier 330 overlays the obfuscation element 208d on top of the displayed information 208a in order to obfuscate the displayed information 208a.

In some implementations, the obfuscation operation performed by the pixel modifier 330 includes removing objects of the first object type 324a. For example, as shown in FIG. 2F, the pixel modifier 330 removes the display 206 in order to generate the modified image data frame 200f.

In some implementations, the pixel labeler 320 adds a respective permission type 326 to the pixel characterization vectors 322. In some implementations, the permission type 326 indicates a permission level for a corresponding user type. For example, in some implementations, the permission type 326 indicates that for users that are categorized as customers, information on displays (e.g., the displayed information 208a shown in FIG. 2A) is to be replaced with a company logo. In some implementations, the permission type 326 indicates that for users that are categorized as colleagues or company employees, information on displays is to be blurred. In some implementations, the permission type 326 indicates that for users that are colleagues, family photos are to be obfuscated and whiteboards are not to be obfuscated. In some implementations, the permission type 326 indicates that for users that are categorized as family members, whiteboards are to be obfuscated and family photos are not to be obfuscated.

In some implementations, a degree of obfuscation performed by the pixel modifier 330 is based on the permission type 326 and a type of the end user. For example, if the end user is a customer, then the pixel modifier 330 replaces information on all displays with the company logo. If the end user is a colleague, then the pixel modifier 330 removes all family photos and leaves the whiteboards. If the end user is a family member, then the pixel modifier 330 obfuscates all whiteboards and leaves the family photos. More generally, in various implementations, the pixel modifier 330 generates the modified pixel data 62 based on the permission type 326 and a user type of the end user (e.g., a user type of the client device 40).

In some implementations, the pixel labeler 320 flags pixels having the first object label 324a. In some implementations, the pixel labeler 320 sets a flag in metadata of the pixel data. For example, the pixel labeler 320 sets a flag in the metadata of pixel data that have the first object label 324a, and the pixel labeler 320 does not set the flag in the metadata of pixel data that do not have the first object label 324a.

As described herein, in some implementations, the data obtainer 310 receives the image data frame 50 from the camera 20a. As such, in some implementations, the image data frame 50 corresponds to a physical environment (e.g., real-world scene). Moreover, in such implementations, the first object label 324a references (e.g., specifies, or identifies) a physical article (e.g., a real-world object).

As described herein, in some implementations, the data obtainer 310 receives the image data frame 50 from the CGR system 20c. As such, in some implementations, the image data frame 50 corresponds to a CGR environment. In some implementations, the CGR environment includes a virtual environment. In some implementations, the CGR environment includes an augmented reality (AR) environment, a virtual reality (VR) environment, a composite reality (CR) environment or a mixed reality (MR) environment. In some implementations, the first object label 324a references a CGR object (e.g., a virtual object, for example, an AR object, a VR object, or an MR object).

FIG. 4A is a flowchart representation of a method 400 for synthesizing a modified image data frame in accordance with some implementations. In various implementations, the method 400 is performed by a device (e.g., the filtering device 300 shown in FIGS. 1 and 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining an image data frame that includes a plurality of pixels, generating a pixel characterization vector for each pixel, modifying pixel data for pixels having a first object label, and synthesizing a modified image data frame.

As represented by block 410, in various implementations, the method 400 includes obtaining an image data frame (e.g., the image data frame 50 shown in FIGS. 1 and 3, and/or the image data frame 200a shown in FIG. 2A). In some implementations, the image data frame includes a plurality of pixels. For example, the image data frame 50 includes various pixels. In some implementations, each pixel is associated with respective pixel data. For example, as shown in FIG. 1A, a first pixel of the image data frame 50 is associated with the first pixel data 52a, a second pixel of the image data frame 50 is associated with the second pixel data 52b . . . and an nth pixel of the image data frame 50 is associated with the nth pixel data 52n.

As represented by block 410a, in some implementations, the method 400 includes capturing the image data frame via a camera coupled with the device. For example, as shown in FIG. 1A, in some implementations, the method 400 includes capturing the image data frame 50 via the camera 20a. In some implementations, the method 400 includes receiving the image data frame from another device. For example, as shown in FIG. 1A, in some implementations, the method 400 includes receiving the image data frame 50 from the image source 20.

As represented by block 410b, in some implementations, the image data frame is part of a video feed. For example, in some implementations, the image data frame is a video frame that is extracted from a video. In some implementations, the video is a pre-recorded video. Alternatively, in some implementations, the video is a live video (e.g., a livestream).

As represented by block 410c, in some implementations, the image data frame corresponds to a physical environment (e.g., a real-world scene). For example, as shown in FIG. 1A, in some implementations, the image data frame 50 is captured by the camera 20a. Alternatively, in some implementations, the image data frame corresponds to a CGR environment (e.g., a virtual scene). For example, as shown in FIG. 1A, in some implementations, the image data frame 50 is generated by the CGR system 20c.

As represented by block 420, in various implementations, the method 400 includes generating a respective pixel characterization vector for each of the plurality of pixels. For example, as shown in FIG. 3, the pixel labeler 320 generates the pixel characterization vector 322 for each pixel in the image data frame 50. In some implementations, each pixel characterization vector includes an object label indicating an object type that the corresponding pixel of the plurality of pixels represents. For example, as shown in FIG. 3, each pixel characterization vector 322 includes an object label 324 indicating an object type that the corresponding pixel represents.

As represented by block 420a, in some implementations, a pixel labeler generates the pixel characterization vectors. For example, as shown in FIG. 1A, the pixel labeler 320 generates the pixel characterization vectors 322. As represented by block 420b, in some implementations, a machine learning segmentation system generates the pixel characterization vectors. In some implementations, the pixel labeler 320 utilizes a neural network in order to generate the pixel characterization vectors 322 and/or to determine the object labels 324 included in the pixel characterization vectors 322. In some implementations, the method 400 includes training the pixel labeler and/or the machine learning segmentation system in order to identify the object type of an object represented by a pixel. In some implementations, the method 400 includes providing training data to the pixel labeler and/or the machine learning segmentation system. In some implementations, the training data includes images and operator-curated (e.g., human-curated) labels that identify object types in the images.

As represented by block 430, in various implementations, the method 400 includes modifying corresponding pixel data of the plurality of pixels having a first object label. For example, as shown in FIG. 3, the pixel modifier 330 modifies the pixel data for the first pixel and the third pixel. In some implementations, the method 400 includes generating modified pixel data for pixels having the first object label, and replacing pixel data of the pixels having the first object label with their modified pixel data. For example, as shown in FIG. 3, the pixel modifier 330 generates the modified pixel data 62a and 62c for the first pixel and the third pixel, respectively. In the example of FIG. 3, the pixel modifier 330 replaces the pixel data of the first pixel and the third pixel with the modified pixel data 62a and 62c, respectively. In various implementations, modifying pixel data of pixels having the first object label allows obfuscation of objects corresponding to the first object label while still allowing users to view objects that do not correspond to the first object label thereby improving the operability of the device and enhancing user experience.

As represented by block 430a, in some implementations, the method 400 includes changing the corresponding data in order to obfuscate a first object type, indicated by the first object label, from the first modified image data frame. For example, as shown in FIGS. 2A and 2B, the filtering device 300 changes the pixel data for the pixels corresponding to the display 206 in order to obfuscate the displayed information 208a from the modified image data frame 200b.

As represented by block 430b, in some implementations, the method 400 includes blurring the plurality of pixels having the first object label in order to obfuscate a first object type, indicated by the first object label, from the first modified image data frame. For example, as shown in FIGS. 2A and 2B, the filtering device 300 blurs the pixels corresponding to the display screen of the display 206 in order to obfuscate the displayed information 208a from the modified image data frame 200b.

As represented by block 430c, in some implementations, the method 400 includes changing corresponding pixel values of the plurality of pixels having the first object label. In some implementations, the method 400 includes changing the RGB values of the pixels having the first object label. In some implementations, the method 400 includes setting the corresponding pixel values to a particular color (e.g., black, white, green, blue, etc.). For example, as shown in FIGS. 2A and 2E, the filtering device 300 sets the pixels values corresponding to the displayed information 208a to black in order to display the blacked-out screen 208e.

As represented by block 430d, in some implementations, the method 400 includes identifying pixels of the plurality of pixels having the first object label. For example, as shown in FIG. 3, the pixel modifier 330 identifies pixels in the image data frame 50 that have the first object label 324a. In some implementations, the method 400 includes comparing the object labels included in the pixel characterization vectors with the first object label in order to identify the pixels having the first object label. For example, as shown in FIG. 3, the pixel modifier 330 compares the pixel characterization vectors 322 with the first object label 324a in order to identify the pixels having the first object label 324a.

As represented by block 430e, in some implementations, the first object label references (e.g., identifies, or refers to) a physical article (e.g., real-world object). In some implementations, a physical article refers to an object that exists in a physical environment. Alternatively, in some implementations, the first object label references (e.g., identifies, or refers to) a CGR object (e.g., a virtual object such as an AR object, a VR object, or an MR object). In some implementations, a CGR object refers to an object that exists in a CGR environment.

As represented by block 440, in some implementations, the method 400 includes synthesizing a first modified image data frame that includes modified pixel data for the plurality of pixels having the first object label and unmodified pixel data for the plurality of pixels not having the first object label. For example, as shown in FIGS. 1 and 3, the filtering device 300 (e.g., the modified image synthesizer 340) synthesizes the modified image data frame 60 that includes modified pixel data 62 for the first pixel and the third pixel, and unmodified pixel data 52b and 52d for the second pixel and the fourth pixel.

As represented by block 440a, in some implementations, the method 400 includes providing the first modified image data frame to a rendering and display pipeline. For example, the filtering device 300 (e.g., the modified image synthesizer 340) provides the modified image data frame 60 to a rendering and display pipeline. In some implementations, the method 400 includes transmitting the first modified image data frame to another device. For example, as shown in FIG. 1A, the filtering device 300 transmits the modified image data frame 60 to the client device 40. In some implementations, the method 400 includes displaying the first modified image data frame on a display coupled with the device. For example, the client device 40 shown in FIG. 1A displays the modified image data frame 60 on a display of the client device 40.

In various implementations, synthesizing the modified image data frame reduces the need to block transmittal of image data frames in order to avoid transmitting certain information. As discussed herein, being able to transmit and/or receive image data frames tends to provide an enhanced user experience. In some implementations, synthesizing the modified image data frame reduces the need for a sequence of user inputs that manually turn video transmission ON/OFF in order to avoid transmitting undesirable information. Reducing user inputs tends to decrease the amount of time that a display has to be kept ON thereby extending the battery life of battery-operated devices and improving their operability.

Figure 4B:
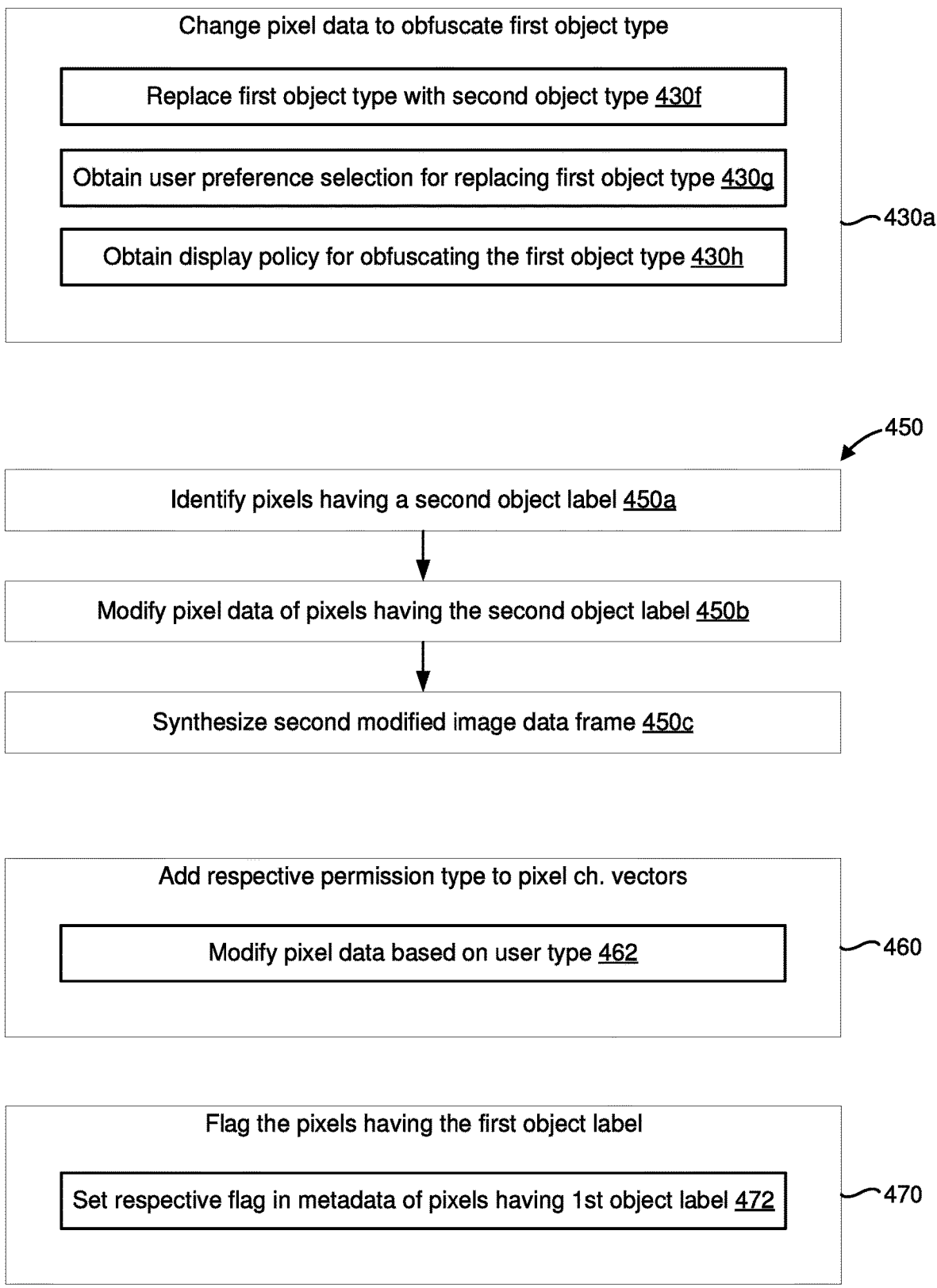

Referring to FIG. 4B, as represented by block 430f, in some implementations, the method 400 includes replacing the first object type with a second object type. For example, with reference to FIGS. 2A and 2C, the filtering device 300 replaces the displayed information 208a with the replacement information 208c. As represented by block 430g, in some implementations, the method 400 includes obtaining (e.g., receiving or retrieving) a user preference selection for replacing the first object type. As represented by block 430h, in some implementations, the method 400 includes obtaining (e.g., receiving or retrieving) a display policy for obfuscating the first object type. For example, as shown in FIG. 3, the pixel modifier 330 obtains the display policy 332 which specifies that objects having the first object label 324a are to be obfuscated.

As represented by 450, in some implementations, the method 400 includes filtering the first modified image data frame in order to obfuscate objects of a second object type from the first modified image data frame. For example, in some implementations, the method 400 includes filtering the modified image data frame 200b shown in FIG. 2B in order to obfuscate human faces. As represented by block 450a, in some implementations, the method 400 includes identifying the plurality of pixels having a second object label (e.g., a human face). As represented by block 450b, in some implementations, the method 400 includes modifying corresponding pixel data of the plurality of pixels having the second object label (e.g., modifying pixel data of pixels that correspond to human faces). As represented by block 450c, in some implementations, the method 400 includes synthesizing a second modified image data frame that includes modified pixel data for the plurality of pixels having the second object label and unmodified pixel data for the plurality of pixels not having the second object label. For example, in some implementations, the method 400 includes synthesizing a modified image data frame that obfuscates human faces and displays but leaves everything else intact.

As represented by block 460, in some implementations, the method 400 includes adding to the pixel characterization vectors a respective permission type. In some implementations, the permission type indicates a permission level for a corresponding user type associated with an object type. For example, as shown in FIG. 3, the pixel labeler 320 adds respective permission types 326 to the pixel characterization vectors 322. As represented by block 462, in some implementations, the method 400 includes modifying the corresponding pixel data based on a user type of a current user. For example, if the end user is a colleague of a person transmitting the image data frame, then the filtering device 300 displays the blurred information 208b shown in FIG. 2B. However, if the end user is a customer of the person transmitting the image data frame, then the filtering device 300 displays the replacement information 208c shown in FIG. 2C.

As represented by block 470, in some implementations, the method 400 includes flagging the plurality of pixels having the first object label. In the examples of FIGS. 2A-2F, the filtering device 300 flags pixels that correspond to the display 206. As represented by block 472, in some implementations, the method 400 includes setting a respective flag in metadata of the plurality of pixels having the first object label. In the example of FIGS. 2A-2F, the filtering device sets a flag in the metadata of pixel data corresponding to the display 206.

Figure 5:
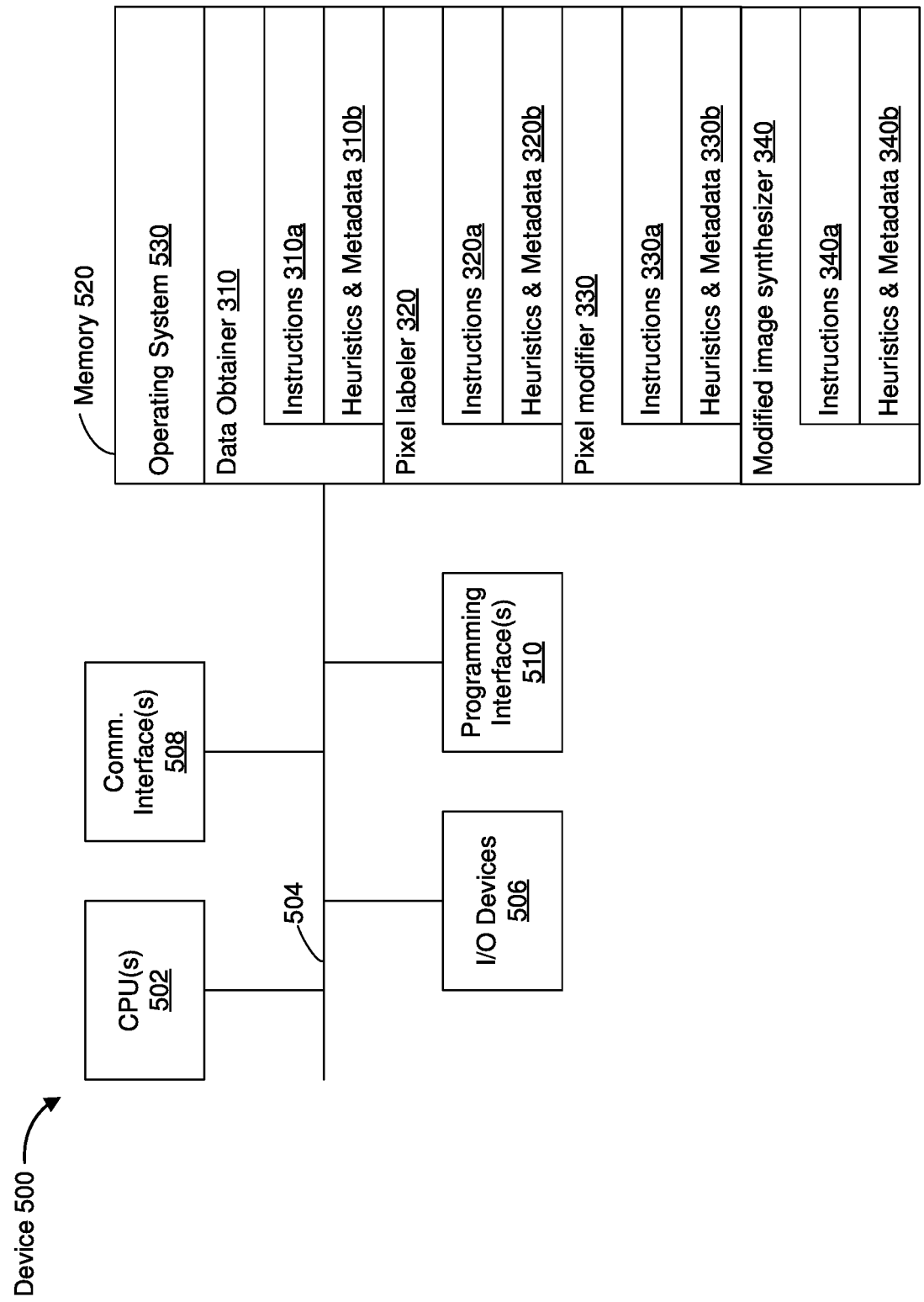
FIG. 5 is a block diagram of a device that synthesizes a modified image data frame in accordance with some implementations.

FIG. 5 is a block diagram of a device 500 (e.g., the filtering device 300 shown in FIGS. 1 and 3) that synthesizes a modified image data frame in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 500 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors (e.g., one or more cameras, for example, a front-facing camera), one or more displays (e.g., one or more CGR displays), and/or the like.

The memory 520 may include high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530, the data obtainer 310, the pixel labeler 320, the pixel modifier 330, and the modified image synthesizer 340.

The operating system 530 includes procedures for handling various basic system services and for performing hardware dependent tasks.

As described herein, in various implementations, the data obtainer 310 obtains (e.g., receives or retrieves) image data frames (e.g., the image data frame 50 shown in FIGS. 1 and 3). To that end, the data obtainer 310 includes instructions 310*a*, and heuristics and metadata 310*b*. As described herein, in various implementations, the pixel labeler 320 generates pixel characterization vectors for pixels in an image data frame (e.g., the pixel characterization vectors 322 shown in FIG. 3). To that end, the pixel labeler 320 includes instructions 320*a*, and heuristics and metadata 320*b*. As described herein, in various implementations, the pixel modifier 330 modifies one or more of the pixels in the image data frame in order to obfuscate an object having a first object label (e.g., the pixel modifier 330 generates the modified pixel data 62 shown in FIGS. 1 and 3). To that end, the pixel modifier 330 includes instructions 330*a*, and instructions and heuristics 330*b*. As described herein, in various implementations, the modified image synthesizer 340 synthesizes a modified image data frame that includes modified pixel data for pixels corresponding to the first object label and unmodified pixel data for pixels that do not correspond to the first object label (e.g., the modified image data frame 60 includes modified pixel data 62 for the first and third pixels, and unmodified pixel data 52*b* and 52*d* for the second and fourth pixels). To that end, the modified image synthesizer 340 includes instructions 340*a*, and instructions and heuristics 340*b*.

Although the data obtainer 310, the pixel labeler 320, the pixel modifier 330 and the modified image synthesizer 340 are shown as residing on a single device (e.g., the filtering device 300), it should be understood that in other implementations, any combination of the data obtainer 310, the pixel labeler 320, the pixel modifier 330 and the modified image synthesizer 340 may be located in separate computing devices.

Moreover, FIG. 5 is intended more as functional description of the various features which be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
        obtaining an image data frame, wherein the image data frame includes a plurality of pixels;
        generating a respective pixel characterization vector for each of the plurality of pixels, wherein each pixel characterization vector includes an object label indicating an object type that the corresponding pixel of the plurality of pixels represents;
        in accordance with a display policy:
            in response to a target viewer being associated with a first category, modifying corresponding pixel data of the plurality of pixels having a first object label to obfuscate a first object type indicated by the first object label while forgoing modification of corresponding pixel data of the plurality of pixels having a second object label to allow the target viewer to view a second object type indicated by the second object label; and
            in response to the target viewer being associated with a second category that is different from the first category, modifying the corresponding pixel data of the plurality of pixels having the second object label to obfuscate the second object type indicated by the second object label while forgoing modification of the corresponding pixel data of the plurality of pixels having the first object label to allow the target viewer to view the first object type indicated by the first object label, wherein the second object type is different from the first object type; and
        synthesizing a modified image data frame that includes modified pixel data for the plurality of pixels having the first object label or modified pixel data for the plurality of pixels having the second object label and unmodified pixel data for the plurality of pixels not having the first object label or the second object label.

2. The method of claim 1, wherein modifying the corresponding pixel data of the plurality of pixels having the first object label includes changing the corresponding pixel data of the plurality of pixels having the first object label; and
    wherein modifying the corresponding pixel data of the plurality of pixels having the second object label includes changing the corresponding pixel data of the plurality of pixels having the second object label.

3. The method of claim 2, wherein modifying the corresponding pixel data of the plurality of pixels having the first object label includes replacing the first object type; and
    wherein modifying the corresponding pixel data of the plurality of pixels having the second object label includes replacing the second object type.

4. The method of claim 2, further comprising:
    obtaining a user preference selection for replacing the first object type.

5. The method of claim 1, wherein modifying the corresponding pixel data of the plurality of pixels having the first object label includes blurring the plurality of pixels having the first object label in order to obfuscate the first object type, indicated by the first object label, from the modified image data frame; and
    wherein modifying the corresponding pixel data of the plurality of pixels having the second object label includes blurring the plurality of pixels having the second object label in order to obfuscate the second object type, indicated by the second object label, from the modified image data frame.

6. The method of claim 1, wherein modifying the corresponding pixel data of the plurality of pixels having the first object label includes changing corresponding pixel values of the plurality of pixels having the first object label.

7. The method of claim 6, wherein changing the corresponding pixel values includes setting the corresponding pixel values to a particular color.

8. The method of claim 1, further comprising:
    adding to the pixel characterization vectors a respective permission type, wherein the permission type indicates a permission level for a corresponding user type associated with an object type.

9. The method of claim 8, wherein modifying the corresponding pixel data of the plurality of pixels having the first object label includes modifying the corresponding pixel data based on a user type of a current user.

10. The method of claim 1, further comprising:
    flagging the plurality of pixels having the first object label.

11. The method of claim 10, wherein the flagging comprises:
    setting a respective flag in metadata of the plurality of pixels having the first object label.

12. The method of claim 1, further comprising:
    providing the modified image data frame to a rendering and display pipeline.

13. The method of claim 12, wherein providing the modified image data frame includes transmitting the modified image data frame to another device.

14. The method of claim 12, wherein providing the modified image data frame includes displaying the modified image data frame on a display coupled with the device.

15. The method of claim 1, wherein a pixel labeler generates the pixel characterization vectors.

16. The method of claim 1, wherein modifying the corresponding pixel data of the plurality of pixels having the first object label includes replacing information represented by the plurality of pixels having the first object label with replacement information specified by the display policy or a user of the device.

17. The method of claim 1, wherein modifying the corresponding pixel data of the plurality of pixels having the first object label includes overlaying an obfuscation element on top of information represented by the plurality of pixels having the first object label.

18. The method of claim 1, wherein modifying the corresponding pixel data of the plurality of pixels having the first object label includes removing information represented by the plurality of pixels having the first object label such that the information is missing from the modified image data frame.

19. The method of claim 1, wherein each pixel characterization vector further includes a permission type indicating a permission level for a category of viewers;
wherein viewers in the first category do not have permission to view the first object type and have permission to view the second object type; and
wherein viewers in the second category have permission to view the first object type and do not have permission to view the second object type.

20. A device comprising:
one or more processors;
a non-transitory memory; and
one or more programs stored in the non-transitory memory, which, when executed by the one or more processors, cause the device to:
obtain an image data frame, wherein the image data frame includes a plurality of pixels;
generate a respective pixel characterization vector for each of the plurality of pixels, wherein each pixel characterization vector includes an object label indicating an object type that the corresponding pixel of the plurality of pixels represents;
in accordance with a display policy:
in response to a target viewer being associated with a first category, modify corresponding pixel data of the plurality of pixels having a first object label to obfuscate a first object type indicated by the first object label while forgoing modification of corresponding pixel data of the plurality of pixels having a second object label to allow the target viewer to view the second object type indicated by the second object label; and
in response to the target viewer being associated with a second category that is different from the first category, modify the corresponding pixel data of the plurality of pixels having the second object label to obfuscate the second object type indicated by the second object label while forgoing modification of the corresponding pixel data of the plurality of pixels having the first object label to allow the target viewer to view the first object type indicated by the first object label, wherein the second object type is different from the first object type; and
synthesize a modified image data frame that includes modified pixel data for the plurality of pixels having the first object label or modified pixel data for the plurality of pixels having the second object label, and unmodified pixel data for the plurality of pixels not having the first object label or the second object label.

21. The device of claim 20, wherein modifying the corresponding pixel data of the plurality of pixels having the first object label includes replacing information represented by the plurality of pixels having the first object label with replacement information specified by the display policy or a user of the device.

22. The device of claim 20, wherein modifying the corresponding pixel data of the plurality of pixels having the first object label includes overlaying an obfuscation element on top of information represented by the plurality of pixels having the first object label.

23. The device of claim 20, wherein each pixel characterization vector further includes a permission type indicating a permission level for a category of viewers;
wherein viewers in the first category do not have permission to view the first object type and have permission to view the second object type; and
wherein viewers in the second category have permission to view the first object type and do not have permission to view the second object type.

24. A non-transitory memory storing one or more programs, which, when executed by one or more processors of a device, cause the device to:
obtain an image data frame, wherein the image data frame includes a plurality of pixels;
generate a respective pixel characterization vector for each of the plurality of pixels, wherein each pixel characterization vector includes an object label indicating an object type that the corresponding pixel of the plurality of pixels represents and a permission type indicating a permission level for a category of viewers;
in accordance with a display policy:
in response to a target viewer being associated with a first category that does not have permission to view a first object type and has permission to view a second object type, modify corresponding pixel data of the plurality of pixels having a first object label to obfuscate a first object type indicated by the first object label while forgoing modification of corresponding pixel data of the plurality of pixels having a second object label to allow the target viewer to view the second object type indicated by the second object label; and
in response to the target viewer being associated with a second category that has permission to view the first object type and does not have permission to view the second object type, modify the corresponding pixel data of the plurality of pixels having the second object label to obfuscate the second object type indicated by the second object label while forgoing modification of the corresponding pixel data of the plurality of pixels having the first object label to allow the target viewer to view the first object type indicated by the first object label, wherein the second object type is different from the first object type; and
synthesize a modified image data frame that includes modified pixel data for the plurality of pixels having the first object label or modified pixel data for the plurality of pixels having the second object label and unmodified pixel data for the plurality of pixels not having the first object label or the second object label.

25. The non-transitory memory of claim 24, wherein modifying the corresponding pixel data of the plurality of pixels having the first object label includes replacing information represented by the plurality of pixels having the first object label with replacement information specified by the display policy or a user of the device.

26. The non-transitory memory of claim 24, wherein modifying the corresponding pixel data of the plurality of pixels having the first object label includes overlaying an obfuscation element on top of information represented by the plurality of pixels having the first object label.

* * * * *